United States Patent

[11] 3,604,903

[72] Inventors John L. Hill;
Neil B. Howes, both of St. Paul, Minn.
[21] Appl. No. 769,822
[22] Filed Oct. 23, 1968
[45] Patented Sept. 14, 1971
[73] Assignee Ramsey Engineering Company
St. Paul, Minn.

[54] MATERIAL DISPENSING CONTROL SYSTEM
14 Claims, 4 Drawing Figs.
[52] U.S. Cl. .................................................. 235/92 PE,
235/92 CC, 235/92 FL, 235/151.1
[51] Int. Cl. ....................................................... H03k 21/36
[50] Field of Search ........................................... 235/92,
151.1

[56] References Cited
UNITED STATES PATENTS
3,229,077 1/1966 Gross ........................... 235/151.34

2,997,234 8/1961 Hughes ........................ 235/160
3,163,747 12/1964 Veverka ....................... 235/92
Primary Examiner—Maynard R. Wilbur
Assistant Examiner—Robert F. Gnuse
Attorney—Dugger, Peterson, Johnson and Westman ABSTRACT: An electronic system produces a train of electrical pulses or signals for controlling the dispensing of materials in different amounts or proportions, such as desired in the automatic batching of concrete. By control settings preset on a main electronic decimal counter, a prescribed number of pulses is delivered by the system to a mechanical analog device which in turn controls the material-dispensing mechanism. Additional presettable electronic counters are combined with the main decimal counter to achieve any number of batch formulations proportioned on the basis of arithmetic ratios established by the control settings selected on the counters.

INVENTORS
JOHN L. HILL
NEIL B. HOWES

BY Dugger, Peterson, Johnson & Westman
ATTORNEYS

3,604,903

MATERIAL DISPENSING CONTROL SYSTEM

BACKGROUND OF THE INVENTION

1. Field of the Invention

This invention relates generally to control systems for weighing materials in different desired amounts or proportions, and pertains more particularly to means for generating a prescribed but adjustable number of output pulses where each pulse provides for metering or dispensing a fixed amount of material.

2. Description of the Prior Art

In the preparation of batches of material, it is necessary to bring various ingredients together in prescribed amounts repeatedly. This is particularly true in the manufacture of concrete blocks, ready-mix concrete, animal feeds, fertilizer, etc. In systems which automate the batching process, various analog methods have been employed which compare the weight or volume of each material against a predetermined criterion. Usually this is accomplished by producing an electrical or mechanical analog of the actual weight which is compared in an electrical or mechanical comparator with a similar analog representing the desired weight of the material. In certain of such systems the analog representation is accomplished by changing the angular position of a separate pointer mechanism which is attached to the face of a dial scale used to weigh the delivered material. The separate pointer cooperates with a weighing pointer to regulate the feeding mechanism for the material being dispensed. The feeding mechanism is started by an initiating command, but is slowed and/or stopped by the coincidence of the two pointers on the face of the dial scale. Systems of this type are simple and operate well in many situations where the same batch composition and size is repeatedly reproduced. However, where it is desired that each successive batch be of a different composition, or of a different size, the necessary modifications to the analog representation of the desired material weights is usually tedious and complex. Many prior art systems cannot be used outside a fixed range of batch sizes or weights, unless extensively modified by addition and substitution of various electronic and mechanical components.

SUMMARY OF THE INVENTION

Accordingly, the principal object of the present invention is to provide a material dispensing system that either obviates or minimizes the shortcomings of the material-dispensing systems presently available, particularly with respect to their lack of versatility. Another object of the invention resides in a dispensing system which employs digital representations of the various quantities being dispensed without resorting to elaborate mechanism usually associated with digital approaches to this control function.

A further object of this invention is to provide the functions of addition, multiplication and division of the prescribed material quantities without utilizing data-processing elements more complex than simple pulse counters.

Briefly stated, our invention includes a pulse generator that produces a train of pulses in response to an initial stimulus achieved by closing a switch. The number of pulses is representative of the desired quantity of material being dispensed and is determined by control settings selected on a main decimal counter. When the prescribed number of pulses have been delivered, the main decimal counter produces a stop signal which terminates the generation of pulses and hence, the dispensing of material is terminated at the desired quantity. Through the intervention of secondary electronic counters, a large variety of arithmetic ratios between the number of pulses and a given state of the decimal counter is achieved.

DESCRIPTION OF THE PREFERRED EMBODIMENT

Figure 1:
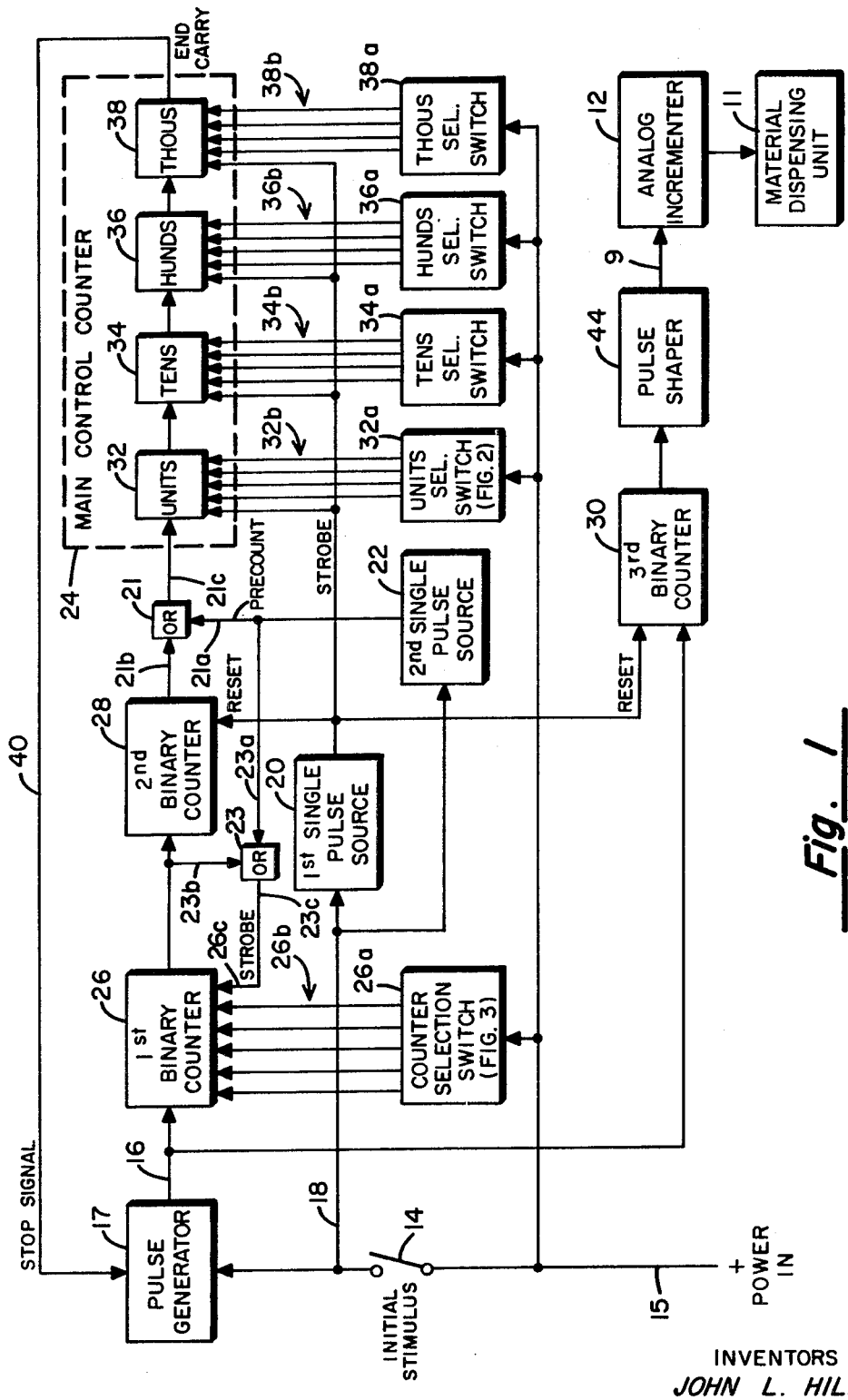
FIG. 1 is a block diagram exemplifying the preferred embodiment of the present invention.

Referring to FIG. 1, the invention is best understood by keeping in mind that the general objective of the entire system is to produce a train of electrical signals or output pulses at 9 which are effective to control the material dispensing unit 11. Pulse count rather than pulse frequency is the measuring signal to a mechanical incrementer 12 which affords an analog control of the dispensing unit 11. For simplicity, the detailed construction of the analog incrementer 12 is not shown, but in a preferred form, the mechanical incrementer 12 consists of an auxiliary rotatable pointer on the face of a dial scale. This auxiliary pointer carries an illuminating lamp and cooperating photocell, and the normal weight indicating pointer carries an opaque member which passes into the light path when the two pointers are coincident. The resulting interruption of the light beam on the photocell stops operation of the dispensing unit 11. The positioning of the auxiliary pointer is by means of a stepping motor and an associated gear train, so proportioned that one or more electrical pulses to the stepping motor results in the advance of the pointer by exactly one weight unit. Normally, the motor is driven by a controlled series of pulses only in the up-scale direction, and is later returned by the continuous application of pulses terminated only when the pointer reaches its zero position on the dial.

Each cycle of operation is started by closing switch 14. This applies voltage from a single power source 15 to a controlled oscillator or pulse generator 17, causing the generator 17 to produce a train of equally spaced pulses at 16. The frequency of these pulses depends upon the requirements of the analog incrementer 12, i.e. the pulse rate must be rapid enough so the time required to complete the dispensing is not objectionably long nor so rapid as to exceed the acceleration rates of the mechanical devices. A preferred pulse rate is in the range of 25 to 4,000 pulses per second. Closing switch 14 also applies voltage via path 18 to a first single-pulse source 20 and second single-pulse source 22. Circuit constants are chosen for the pulse generator 17 and each of the single pulse sources 20 and 22 such that the single pulses from 20 and 22 precede the initial pulse of generator 17. Also, the pulse from single-plus source 20 precedes that produced by pulse source 22.

Our invention employs four electronic counting devices: a main decimal counter 24, a first binary counter 26, a second binary counter 28, and a third binary counter 30. Each counter is an integrated electronic circuit (IC) and includes one or more sets of bistable storage elements or flip-flops, each of which transfers back and forth between its two stable states upon reception of short duration (0.5 microseconds) pulses. The pulses to be counted are applied to one of the bistable elements. Each time this binary element changes from the state representing "1" to the state representing "0," a pulse is caused to be sent to the next element in the set, and this process continues in a similar manner for all of the bistable elements in each separate counter. When the decimal number system is used, such as in counter 24, elements having four binary flip-flops and 10 stable states are used; and each time a given element changes from the state representing "9" to the state representing "0," a pulse is sent to the next element. It should also be noted in FIG. 1 that the input terminal of each counting device is consistently shown on the left-hand side of its rectangular block.

In operation, each of the counters moves through a prescribed succession of states as pulses are received at its input terminal. From an initial state of "all zeros," a counter accumulates pulses until it reaches its "full capacity state,"

which corresponds to "9" on a decimal counter or "3," "7," "15" or "31" in the case of binary counters (depending upon the number of flip-flops). Transition from the full capacity state to the zero state occurs whenever a counter receives one additional pulse. This is referred to as the "carry," and may constitute the input pulse to a succeeding counter. The carry is consistently shown as leaving the right-hand of each block representing the individual counter.

The main control counter 24 includes four decimal counter units 32, 34, 36 and 38 which are cascaded to provide units, ten's, hundred's and thousand's decades, respectively. Corresponding selector switches for installing an initial setting on these decimal counters are designated by the numerals 32a, 34a, 36a and 38a, respectively. Four wires interconnecting each of the counters with their respective selector switch are designated by the numerals 32b to 38b.

It is a property of the flip-flop counting elements employed in this invention that they possess a set of input terminals and gates such that a preset condition may be continuously applied to the input terminal for each flip-flop which will, only when simultaneously accompanied by a pulse input on a "strobe" terminal, preset the flip-flop to a selected one of its two states. By the employment of this property, a set of DC voltages may be established by a corresponding set of single pole switches representative of a preset number to which the associated flip-flops will be set upon the occurrence of the strobe. By this means, each of the counters may be caused to assume a preset number between zero and its full counting range each time the strobe occurs, and thus the number of normal input pulses required for the production of the carry may be arbitrarily established at any desired value. Counting devices having this presettable property are commercially available from several manufacturers, and those designated as N–8280 and N–8281 constitute decimal and binary devices available from the Signetics Corporation, 811 East Arques Avenue, Sunnyvale, Calif.

As explained above, the number of pulses required at the input terminal of each of the decimal counters to cause a carry is equal to their full counting range minus the present state of the flip-flops. In other words, for each state of the flip-flops, a specific number of input pulses is required to produce the carry. For example, when the state of the flip-flops in a decimal counter corresponds to the state "9," one additional input pulse will produce a carry; when "8, " two input pulses; when "7," three, etc. Of course, if the flip-flops are in their initial "zero" state, then 10 input pulses are required to produce the carry. Extending this concept to the cascaded counter units of the main control counter 24, the carry from the highest order or thousand's counter 38 will occur after the number of input pulses is equal to 10,000 minus the initial state placed on the flip-flops by the combined settings of the selector switches 32a, 34a, 36a and 38a. It will be apparent that the digital value of these combined settings on the selector switches 32a through 38a may be any number between "0000" and "9999."b In the case of the first binary counter 26, it is convenient to have the carry from its highest order stage (normally $2^5$ or "32") produce the strobe, and preset the counter to some prescribed number after each carry and before the arrival of the next counting pulse from the generator 17. By this means, the same presettable property permits the application of DC voltages over long wires to adjust the number of input pulses needed to produce the carry to any value between 1 and 32. In consequence of this feature, the number of pulses produced by the generator 17 for each input pulse to the second binary counter 28, or to the counter 32 when counter 28 is omitted, may be established by remote switching of five DC leads 26b interconnecting switch mechanism 26a and counter 26.

The binary counters 28 and 30 are optionally included in the system only when the function performed by each is desired. Each increases the number of pulses necessary from the generator 17 for a single input pulse to counter 32 or to a pulse shaper 44, respectively. Normally these counters provide selectable ratios of pulses between the generator 17 and the connected device by utilization of all or fewer than all of their flip-flops; and the completely arbitrary selection system described for counter 26 is not employed. It is possible, however, should some not otherwise available ratio be required, that the strobing mechanism used in counter 26 could be employed in either.

It is the function of counter 30 to increase the number of input pulses produced by the generator 17 for each input pulse to the shaper 44. As will subsequently be described, this action provides for arithmetic division of the material amount. In a similar manner, the function of counter 28 increases the number of pulses from the generator 17 required for each input pulse to the counter 32; however, by its placement in the system, this action results in multiplication of the number of pulses to the shaper 44 for a given setting of the decimal selector switches 32a–38a.

Main control counter 24 is shown having a feedback loop 40 for transmitting a stop signal to pulse generator 17 when the counter 24 issues its end carry. As described above, the number installed on selector switches 32a through 38a will determine the total number of input pulses to counter 24 needed to cause this end carry and produce a stop signal to pulse generator 17. These settings therefore determine the number of pulses required to stop generator 17 and hence shut down the entire material dispensing system. Our circuitry is such that once the pulse generator 17 has been stopped, it cannot produce another train of pulses until the stimulating switch 14 has opened and reclosed.

Two single pulse sources 20 and 22 are provided, both stimulated by the application of energy from the power supply 15 via the initial stimulus switch 14. This switch, which normally closes to initiate the system action, and remains closed until after the desired material amount has been dispensed stimulates the production of one single short-duration pulse from each of these two devices. The pulse from pulse source 20 is utilized to preestablish the state of all counters in the system, except the binary counter 26, and normally results in counters 28 and 30 taking their zero state. In the case of counter 24, it causes the representation produced by the switches 32a through 38a to be impressed on their respective decimal counters. Having accomplished this action, this pulse source remains quiescent until the switch 14 is opened and reclosed. Due to the very short time between closure of this switch and the production of this pulse, it is imperative that there be no bounce in the switch contacts. The duration of this time is typically 100 to 125 microseconds.

As explained previously, the number value applied to the main control counter 24 by the settings on the selection switches 32a through 38a should be 10,000 minus the number of input pulses desired. Expressed another way, the switches specify a digit value equal to "9" minus the desired value for each decimal digit except the most right-hand nonzero digit which will be "10" minus the desired value. This expression of a number is commonly called the "ten's complement." As explained by author R. K. Richards on page 16 of his book entitled "Arithmetic Operations in Digital Computers," the term "ten's complement" in not to be interpreted to mean that each individual digit is a ten's complement. Actually, only the lowest order or least significant nonzero digit is a "ten's complement" of the true digits; higher order digits are nine's complements. For example, the ten's complement of 4,680 is 5,320.

From this, it is apparent that the ten's complement expression is not uniformly related to the digit value for every column. Furthermore, the digital relationship for the ten's complement expression would change as zeros appear in the rightmost columns. It is therefore desirable to produce a completely uniform expression in complementary form.

To produce the completely uniform expression in complementary form, our invention first employs a "nine's complement" expression in the selection switches 32a to 38a, then applies a "precount" of one pulse to counter 24 to convert the nine's complement to a ten's complement. The nine's complement with reference to the cascade counters 32 to 38 is value equal to 9999 minus the desired number of output pulses before the counter 24 issues the end carry; and it differs from the ten's complement by exactly one unit. If it were to be used "uncorrected," the number of impulses to produce an end carry of counter 24 would always be the desired number plus one and would permit tolerable operation only in special cases. As will be readily appreciated, the percentage error would increase with smaller material amounts.

With our invention, it is possible to "correct" the nine's complement, and thus permit its use in the switches 32a to 38a, and thereby permit every digit to deliver to the counter 24 a value equal to nine minus the desired value. The correction takes the form of applying an extra input pulse to the counter 24 after the counter has assumed the nine's complement state and before it has received the first of its normal input pulses. This is the function of the second single-pulse source 22. The pulse source 22 thus provides a single pulse to the units counter 32 of main control counter 24 and this pulse occurs about 50 microseconds after the strobe pulse, which is still considerably in advance of the production of the first pulse generated by pulse generator 17. More specifically on OR gate 21 having a pair of input terminals 21a, 21b and an output terminal 21c is employed. The input terminal 21a is connected directly to the single pulse source 22 and the input terminal 21b to the output of the binary counter 28. As will become apparent hereinafter, the gate 21 assists in eliminating an inaccurate operation that would otherwise occur.

To illustrate the foregoing by example, presume that we desire the counter 24 to carry after receiving 123 input pulses. The nine's complement of 123 is 9876, which is produced in the counter 24 by the combined action of the switches 32a to 38a and the strobe as has been described. Were this to remain uncorrected, the end carry would be produced after 124 input pulses. However, by applying the one pulse precount the counter advances from 9876 (nine's complement) to 9877 (ten's complement). Accordingly, only the desired quantity of 123 additional pulses are required to cause the end carry and shut down pulse generator 17.

Figure 2:
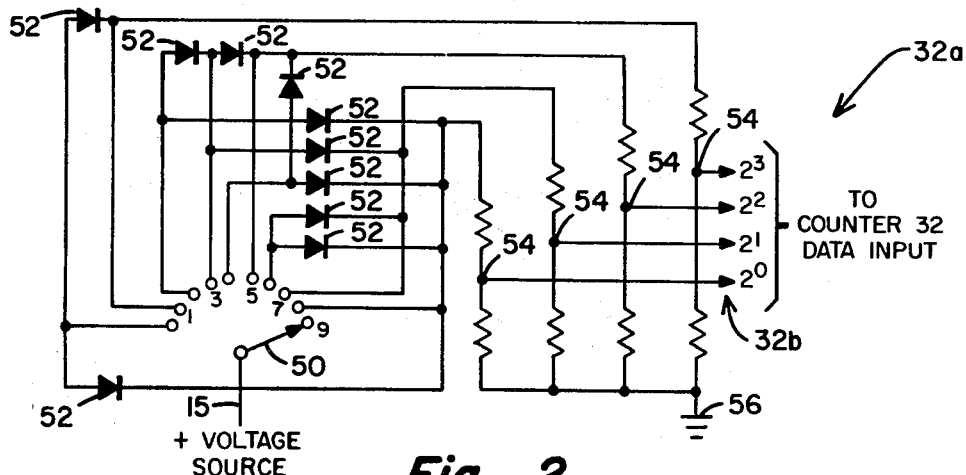
FIG. 2 is a diagrammatic view showing the detailed construction of one of the selection switches associated with the main decimal counter.

Reference is now made to FIG. 2 where the special properties required of switches 32a, 34a, 36a and 38a are illustrated. Since switches 32a to 38a are similarly constructed, only switch 32a is shown in detail. Each of these switches is most conveniently implemented by a single-pole 10-position switch at 50, marked "0" through "9." This implementation is chosen since it also is compatible with conventional punched card reading devices. It is necessary, however, that the output from each switch be in a nine's complement form and binary coded on four wires, designated generally by the numeral 32b. This conversion is readily accomplished in the manner shown by the interconnection of 10 diodes 52, between the nine switch positions marked "0" through "8," and four voltage dividers 54. In the absence of an applied voltage, each divider 54 provides a circuit path to ground 56 on one of the four binary-coding lines 32b which are taken to the data input terminals of units counter 32. The value of the voltage from source 15 and the ratio of the voltage dividers 54 are completely arbitrary requiring only that a suitable voltage (2.5 to 3.0 volts) is available for application to the integrated circuit counting modules data input when the voltage is connected. Since the nine's complement of " 9" is zero, no connection is necessary for the value of nine.

Although the foregoing explanation presumed the continuous application of DC voltages to the data inputs of the decimal counter 32 through 38 via switches 32a through 38a, it is only necessary that these voltages be present during the fractional microsecond interval coincident with the strobe pulse from single pulse source 20. Advantage may be taken of this circumstance to provide a very useful variation of the previously described invention by supplying the data inputs to the individual digits of the counter 24 from a single decimal source and selecting the particular stage of the counter to which the decimal value is applied by selection of the strobe application. This embodiment is particularly useful when the values of the material amount arise from the reading of punched cards.

Figure 4:
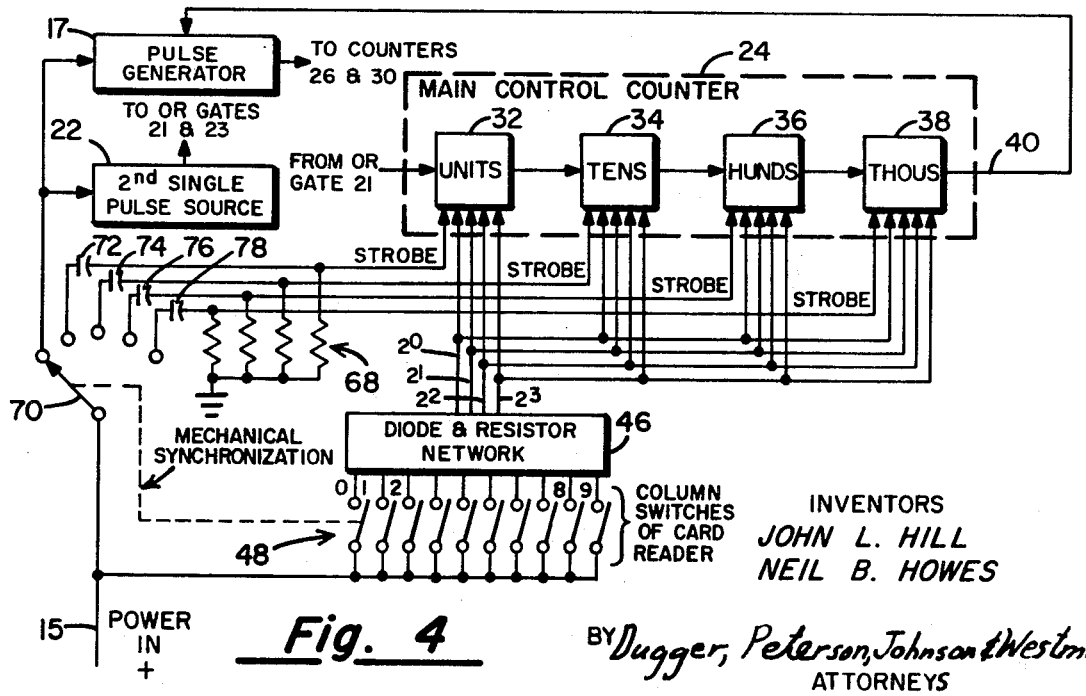
FIG. 4 is a diagrammatic view showing a modified form of the invention.

FIG. 4 illustrates the replacement of first pulse source 20, switch 14 and decimal switches 32a through 38a with a set of card reading switches 48, a diode resistor network 46 (identical in electrical connection and function to that shown in FIG. 2 and identified as 52 and 54), a five-position mechanically operated switch 70, four capacitors 72, 74, 76, 78 and a resistor 68 for each capacitor. The date inputs to all stages of counter 24 are now shown connected in parallel so that any data expression on these four wires will be simultaneously applied to all stages of counter 24.

This variation of the invention commences each cycle of operation by reading a card column relevant to the data required by counter 38, and simultaneously connecting a multiple position switch 70 or pulse distributor to capacitor 78 to apply suitable strobing to only the thousands counting element. As the next card column passes through the card reader, the data relevant to the hundreds digit is applied to the hundreds counter via diode and resistor network 46 while simultaneously switch 70 connects to capacitor 76 to strobe the hundreds counter 36. The tens and units digits operate successively in the same manner, and then switch 70 moves to its fifth position to apply power to pulse generator 17 and single pulse source 22. At this point the remainder of the cycle of operation is identical as in the original invention. It is significant that this embodiment of the invention permits the data from a series of successively read card columns to determine the amount of material dispensed without the employment of any intervening data storage mechanism.

To clarify the function of the electronic binary counters 26, 28 and 30, we might consider the operation of the system assuming these counters to be absent. This assumes that the output of the pulse generator 17 is connected directly to the input of the counter 24 and to a pulse shaper 44, shown in parallel electrical relationship. The function of the pulse shaper 44 is to increase the power level and duration of the generator pulses to levels compatible with the mechanical or electromechanical mechanism used to produce the incrementing of the analog incrementer 12. For simplicity, circuit detail is not shown, but usually a conventional monostable multivibrator is used for this purpose.

With none of the three binary counters 26, 28 and 30 present, the number of pulses emitted at 9 by the pulse shaper 44 after closure of the switch 14 will be exactly the same number required to produce shutdown of pulse generator 17 via the stop signal from counter 24. Thus, the number of pulses will be equal to the ten's complement of the number installed via the selection switches 32a to 38a. For convenience, as has been shown in FIG. 2, the dials of these switches are labeled so as to display the desired number instead of its complement.

Now presume the same configuration except with the addition of the binary counter 26. Note that counter 26 is initially preset by the "precount" pulse from single pulse source 22 and then operates its own strobe on each subsequent end carry. In this regard, an OR gate 23 is utilized having a pair of input terminals 23a, 23b and an output terminal 23c. The input terminal 23a is connected directly to the pulse source 22, whereas the input terminal 23b is connected to the output from the binary counter 26. The output terminal 23c is connected to the strobe terminal of the counter 26 which has been labeled 26c. Thus, through the agency of the OR gates 21 and 23, any output pulse from the binary counter is prevented from being applied to the strobe terminal 26c of the binary counter 26, and any output pulse from the counter 26 is prevented from being forwarded as an input pulse to the main control counter 24. Note also that when counter 28 is not present, this carry becomes the input to the unit's counter 32 of main control counter 24. The pulse shaper 44 remains connected directly to the output of the pulse generator 17. If under this condition, the selection switch 26a is set to the "two's complement" of one, an output from the carry of the counter 26 will occur for each pulse it receives from the generator 17, since each carry will preset the counter to 31 from whence the next oscillator pulse will cause another carry. Thus, the addition of the counter 26 will not change the operation of the system from that of not using counter 26 when switch 26a is set in the manner described. However, for values installed on selection switch 26a which are less than "31," the pulse generator 17 must produce a greater number of pulses for each carry and advance of the units counter 32. In this manner, we accomplish multiplication in the production of output pulses from the pulse shaper 44, since the pulse shaper continues to make one output pulse for each pulse from generator 17.

Figure 3:
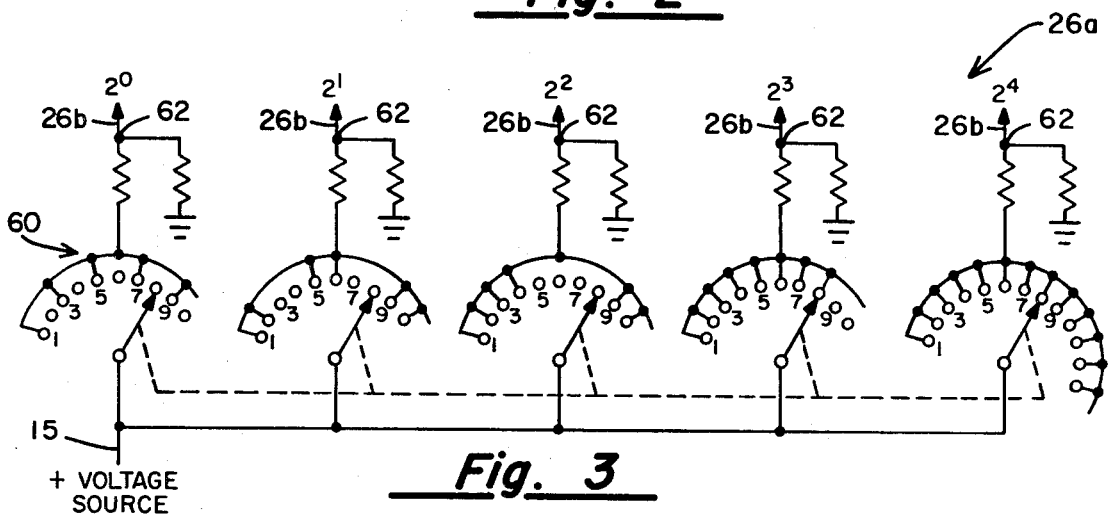
FIG. 3 is a diagrammatic view showing the detailed construction of the selection switch associated with one of the binary counters.

The special properties of switch 26a are illustrated in detail in FIG. 3. For an embodiment permitting 32 selections for the value of the multiplier contributed by counter 26, a five-pole 32-position switch 60 or its equivalent is required. This switch is marked and wired as shown in FIG. 3 so that in the position marked "1," voltage applied to all five voltage dividers 62 for application to the data input to the counter 26 via the five wires 26b. This implementation actually represents the number "31" (the two's complement of one in a modulus 32 system) and functions to preset counter 26 to the binary number "31" upon the application of the precount pulse and upon each carry from counter 26 thereafter. Thus, setting the switch 26a to the position marked "1" will result in the counter 26 producing a carry after each input pulse. When switch 26a is set to the position marked "2," the precount pulse and succeeding carry pulses preset counter 28 to the binary number 30 and carries are produced regularly after each two input pulses. In this manner, switch 26a may select any number between "1" and "32" inclusive, for the effective multiplier of the weight amount represented by the setting of switches 32a through 38a. Although not shown in complete detail, it will be obvious that the $2^4$ output line of the switch will have the first positions wired in parallel, and no connection to the last 16.

Relating this multiplication feature to the batching process, it is now possible, by the selection of a value for counter 26 (as preset on switch 26a) to multiply the value installed on counter 24 for a standard size batch by an integer and thereby have one cycle of operation produce an analog representing a multiple of the standard size batch. By marking the selection switch 26a appropriately, its positioning can easily be performed to achieve specific multiples despite the fact that the switch's contacts express a "two's complement." Thus, it is convenient to consider the binary counter 26 as a multiplier of decimal counter 24.

If we assign the letter "A" to represent the number values installed in switches 32a-38a, and the letter "S" to represent the value set on switch 26a, the number of output pulses produced at 9 can be expressed mathematically as follows:

No. of output pulses = $A \times S$

Consider now the addition of the third binary counter 30. This counter is also an IC counting element and by adding it to the system another factor may be achieved in determining the number of pulses delivered at 9 to the analog incrementer 12. In the design of the counter 30, for the preferred embodiment of the invention, we have determined that only a limited number of values have practical value, and it is convenient to select from the various intermediate terminals of the flip-flops so as to have one input to the pulse shaper 44 for a prescribed number of pulses produced by generator 17. For purposes of the preferred embodiment, these values typically include "2,38 "4," "5," "8," "10" and "16," the value "1" being superfluous since it is achieved also by the omission of the counter 30. Any one of these values can be selected and wired into the input of the pulse shaper 44 with the result that the pulse generator 17 is required to make that many pulses for each output pulse produced at 9 to the analog incrementer 12. This places the value of counter 30 into the denominator of the expression for the number of output pulses produced at 9, and has the practical purpose of permitting the dispensing of fractional amounts of the desired "A" value without changing the value actually expressed by the selection switches 32a-38a. If the letter "M" is used to designate the number of value of binary counter 30, and a concurrent selection is made on counter 26, the mathematical expression for delivery of output pulses at 9 becomes as follows:

No. of output pulses = $A \times S/M$ where "A" represents the number of weight units in a standard size batch, and $S/M$ represents the relationship of the actual batch size to a standard batch size. We will now apply this mathematical relationship to a specific example in the batching process. If "S" is chosen as 5 and "M" is chosen as 4, then the number of pulses delivered from pulse shaper 44 would be 5/4 of "A." Accordingly, a batch 1¼ times a standard batch would be produced.

The function of counter 28 is somewhat similar to that of counter 26, since it causes the number of generator pulses to be multiplied by the particular value selected for the counter 28. Its principal value is to provide accommodation for the actual gear train used between a stepping motor and the mechanical analog incrementer 12 so that the requirement of one pulse for one unit of the dimension used for "A" can be circumvented. For example, by making counter 28 equal to "2," the number of output pulses for a given situation can be doubled to accommodate a condition where one output pulse moves the analog incrementer 12 only one-half of a weight unit. If the letter "G" is used to designate the value of counter 28, then the final mathematical expression for the output pulses is as follows:

No. of pulses = $A \times S \times G/M$

The values of $S$, $M$ and $G$ may be combined to accommodate nonintegral values required for gear and motor combinations more complex those simple conditions described.

In a practical application of our material-dispensing system, such as for the automatic batching of concrete, the value "A" set on counter 24 has a different value for each successive material or ingredient that is dispensed into a single batch. Thus, separate settings of switches 32a-36a may be successively made, or alternatively a separate switch group may be provided for the desired quantities of sand, cement, and aggregate, or additives. When such separate switches are provided, successive operations of the switch 14, during the accumulative weighing of several material into a single weighing mechanism, results in the addition of individual representations weight of successive materials without the necessity of a digital adder. This is accomplished by the successive operation of the control system to advance the analog criterion on the scale dial without returning the latter to its staring position. Simultaneously a different set of switches 32a through 38a is energized by reconnection of the power input wire 15. Each set of such switches represents the amount of the relevant material to be added to the batch. By so doing, the criterion after each operation of the control system represents the sum of the most recent advance plus all previous advances since it was last reset, while the control system behaves only in response to the current material value. The system thereby permits the individual adjustment of the amount for any material without having to make any compensating adjustment of other material amounts to be weighed subsequent to the one altered.

The "S" value on counter 26 may take a different value for successive batches, as the demand for different size batches of different formulations prescribes. As described above, this is achieved by merely making the desired selection on the switch 26a. The values "G" and "M" for counters 28 and 30, respectively are usually fixed at the time of the design of the system and are considered constants in a given embodiment. Nevertheless, the ease in which they can be changed permits great flexibility of application of our material-dispensing system. The invention's versatility may be further enhanced through the use of a punched card reader which supplies the desired "A" values to the counter 24 via a punched card containing the "recipe" for a standard-sized batch.

It will be apparent to those skilled in the art that our material-dispensing system may be modified to achieve yet another desired embodiment. In this embodiment, a material-feeding device is caused to produce one pulse for each unit of weight, (or fractional unit of weight), as it delivers material to a receiving vessel. If these pulses are used in the described system in lieu of those generated by the pulse generator 17, and if the material-feeding device is stopped by the issuance of the end carry from counter 24, a very practical material-dispensing system employing the digital control system previously described may be implemented.

A still further embodiment utilizing the invention is possible by providing a material-dispensing device which delivers one unit of material for each pulse received. In such embodiment, the pulses produced by shaper 44 appearing on output line 9 are applied directly to such material-dispensing device. An appropriate adjustment of the pulse generator frequency may be made to accommodate a very wide variety of such dispensing devices without requiring any other alteration of the described system.

We claim:

1. A system for controlling the dispensing of a material- comprising means for dispensing a predetermined amount of material in accordance with a number of pulses supplied thereto, pulse-generating means for producing a train of pulses, means connecting said material-dispensing means to said generating means so at least a proportional number of pulses produced by said generating means are received by said dispensing means, a main control counter means having an input terminal and an output terminal, selection means for installing an initial setting into said main control counter means, said setting having a value indicative of a quantity of material to be delivered by said dispensing means, an auxiliary counter means having an input terminal connected to said pulse-generating means and an output terminal connected to the input terminal of said main control counter means for forwarding a pulse to said main control counter means only after a certain number of pulses from said pulse-generating means have been counted, selection means connected to said auxiliary counter means for presetting said auxiliary counter means to cause said auxiliary counter means to forward a pulse to said main control counter means after a certain number of pulses from said pulse-generating means have been counted by said auxiliary counter means, the setting installed by said selection means determining said certain number of pulses and thereby causing the value represented by said first-mentioned selection means to be multiplied by an integer determined by the setting of said last-mentioned selection means, means connected to the output terminal of said auxiliary counter means for resetting said auxiliary counter means to the setting installed by said last-mentioned selection means each time a pulse is forwarded to said main control counter means, means connected between the output terminal of said main control counter means and said pulse-generating means for terminating said pulse train after said main control counter has counted a number of pulses determined by the setting of said first-mentioned selection means, and means for providing a single pulse to the input terminal of said main control counter means prior to receipt of a pulse from the output terminal of said auxiliary counter means, whereby the number of pulses supplied to said material dispensing means, and the amount of material delivered therefrom, is determined by both said main control counter and said auxiliary counter.

2. The control system of claim 1 in which the resetting means for said auxiliary counter means includes a strobe terminal and means connected between the output terminal of said auxiliary counter means and said strobe terminal for applying each output pulse at the output terminal of said auxiliary counter means to said strobe terminal to effect the resetting of said auxiliary counter means to said installed setting.

3. The control system of claim 2 including means connecting said single pulse means to said strobe terminal and to said input terminal of said main control counter means so as to assure application of a single pulse to said input terminal of said main control counter means prior to receipt of any pulses from the output terminal of said auxiliary counter means.

4. The control system of claim 3 in which said auxiliary counter means includes a plurality of stages and said selection means therefor includes a switch connected to each of said stages for installing a desired setting into each stage whereby said certain number of pulses can be changed to different number and thereby cause the value installed on said main control counter means to be multiplied by an integer determined by the setting of said last-mentioned selection means.

5. The control system of claim 3 including a second auxiliary counter means, said second auxiliary counter means being connected between said pulse-generating means and said material-dispensing means for counting pulses from said generating means and providing a pulse to said material-dispensing means only after a predetermined number of pulses have been counted, thereby proportionally reducing the number of pulses from said generating means that would otherwise be supplied to said material-dispensing means.

6 A system for controlling the dispensing of a material-comprising means for dispensing a predetermined amount of material in accordance with a number of pulses supplied thereto, pulse-generating means for producing a train of pulses, means connecting said material-dispensing means to said generating means so at least a proportional number of pulses produced by said generator means are received by said dispensing means, a main control counter including a plurality of counting units arranged to denote various ascending numerical orders, means for presetting each of said counting units in accordance with the complement of data contained on a card to determine the number of pulses supplied to said dispensing means, said presetting means including a multiple position switch and a column of card operable switches which multiple position switch successively strobes said counting units to cause each counting unit to be preset to a value in accordance with data contained in column form on said card, said multiple-position switch including a position for causing said pulse-generating means to supply said train of pulses, and a single-pulse means connected to the lowest order unit of said main control counter, said multiple-position switch causing a pulse to be supplied to said lowest order counting unit prior to receipt of any pulses derived from said pulse-generating means.

7. The control system of claim 6 including means connected between the highest order unit of said main control counter and said pulse-generating means for terminating said pulse train after said main control counter has counted a number of pulses determined by said card-operable switches.

8. A system for controlling the dispensing of a material-comprising means for dispensing a predetermined amount of material in accordance with a number of pulses supplied thereto, pulse-generating means for producing a train of pulses, means connecting said material-dispensing means to said generating means so at least a proportional number of pulses produced by said generating means are received by said dispensing means, a main control counter including a plurality of counting units arranged to denote various ascending numerical orders, selection means including a switch for each counting unit for installing an initial setting into the counting unit with which it is associated, said switch settings collectively having a value indicative of a quantity of material to be delivered by said dispensing means, an auxiliary counter connected between said pulse-generating means and the lowest order unit of said main control counter for forwarding a pulse to said main control counter only after a certain number of pulses from said pulse generator have been counted, means connected between the highest order unit of said main control counter and said pulse-generating means for terminating said pulse train after said main control counter has counted a number of pulses determined by said switch settings, means for providing a single pulse to the lowest order counting unit, said auxiliary counter having a strobe terminal, means connecting said single-pulse means to said strobe terminal and to said lower order counting unit so as to assure application of a single pulse to said lower order counting unit prior to receipt of any pulses from said auxiliary counter, said connecting means including an OR gate having a pair of input terminals and an output terminal, one of said input terminals being connected to said single-pulse means, the other of said input terminals being connected to said auxiliary counter and said output terminal being connected to said strobe terminal, whereby a pulse from said single-pulse means or a pulse from said auxiliary counter establishes a particular state of said auxiliary counter, the number of pulses supplied to said material dispensing means, and the amount of material delivered therefrom, thereby being determined by both said main control counter and said auxiliary counter.

9. The control system of claim 7 including a second OR gate having a pair of input terminals and an output terminal, one of said last-mentioned input terminals being connected to said single-pulse means, the other of said last-mentioned input terminals being connected to said auxiliary counter and said last-mentioned output terminal being connected to said lowest order unit of the main control counter, whereby said lowest order unit receives pulses from either said single-pulse means or from said auxiliary counter.

10. A system for controlling the dispensing of a material-comprising means for dispensing a predetermined amount of material in accordance with a number of pulses supplied thereto, pulse-generating means for producing a train of pulses, means connecting said material-dispensing means to said generating means so at least a proportional number of pulses produced by said generating means are received by said dispensing means, a main control counter including a plurality of counting units arranged to denote various ascending numerical orders, selection means including a switch for each counting unit for installing an initial setting into the counting unit with which it is associated, said switch settings collectively having a value indicative of a quantity of material to be delivered by said dispensing means, an auxiliary counter connected between said pulse generating means and the lowest order unit of said main control counter for forwarding a pulse to said main control counter only after a certain number of pulses from said pulse generator have been counted, means connected between the highest order unit of said main control counter and said pulse generating means for terminating sad pulse train after said main control counter has counted a number of pulses determined by said switch settings, means for providing a single pulse to the lowest order counting unit prior to receipt of a pulse from said auxiliary counter, said auxiliary counter having a strobe terminal, means connecting said single-pulse means to said strobe terminal and to said lower order counter unit so as to assure application of a single pulse to said lower order counter unit prior to receipt of any pulses from said auxiliary counter, a second auxiliary counter, said second auxiliary counter being connected between said pulse-generating means and said material-dispensing means for counting the pulses from said generating means and providing a pulse to said material-dispensing means only after a predetermined number of pulses have been counted, thereby proportionally reducing the number of pulses from said generating means that would otherwise be supplied to said material-dispensing means, and an additional single-pulse means for presetting the counting units of said main control counter and said additional auxiliary counter, said additional single-pulse means supplying its pulse in advance of the pulse supplied by said first-mentioned single-pulse means.

11. The control system of claim 10 including a switch for applying voltage from a single power source to said pulse generating means and to both of said single-pulse means, the circuit constants of said generating means causing the production of the single pulse from both of said single pulse means to precede the initial pulse for said generating means.

12. A system for controlling the dispensing of a material-comprising means for dispensing a predetermined amount of material in accordance with a number of pulses applied thereto, pulse-generating means for producing a train of pulses, means connecting said material-dispensing means to said generating means so at least a proportional number of pulses produced by said generating means are received by said dispensing means, a main control counter including a plurality of counting units arranged to denote various ascending numerical orders, means for presetting each of said counting units in accordance with data contained on a card to determine the number of pulses supplied to said dispensing means, each of the counting units of said main control counter being provided with a strobe terminal and the system further including a distributor for sequentially supplying strobe pulses to each of said counting units, said distributor thereafter supplying a command to said pulse-generating means to produce said train of pulses.

13. A system for controlling the dispensing of a material comprising pulse-generating means for producing a train of pulses, a main control counter including a plurality of counting elements arranged to denote various ascending numerical orders, feedback means connected from the output of the highest order counting element to said pulse-generating means for terminating the pulse train after a predetermined number of pulses representative of a desired amount of material have been counted by said main control counter, means for presetting the counting elements of said main control counter so that said elements represent one less than the arithmetic complement of said desired amount, means for applying a precount pulse to said main control counter prior to applying pulses from said pulse-generating means so that said one less than the arithmetic complement is changed to the true arithmetic complement of said desired amount, material dispensing means for delivering material in accordance with the number of pulses supplied thereto from said pulse-generating means, whereby the quantity of material delivered by said material-dispensing means is in accordance with the number of pulses supplied to said main control counter after the application of said precount pulse.

14. The control system of claim 13 in which said first-mentioned complement state is a nine's complement and said second-mentioned complement state is a ten's complement.

PO-1050
(5/69)

UNITED STATES PATENT OFFICE
CERTIFICATE OF CORRECTION

Patent No. 3,604,903    Dated September 14, 1971

Inventor(s) John L. Hill and Neil B. Howes

It is certified that error appears in the above-identified patent and that said Letters Patent are hereby corrected as shown below:

Column 2, line 50, "plus" should be --pulse--. Column 3, line 57, delete "b". Column 5, line 23, "on" should be --an--. Column 6, line 11, "date" should be --data--. Column 7, line 69, delete "38" and insert --"--. Column 8, line 5, after "number" delete "of"; line 46, "material" should be --materials--; line 48, after "tions" insert --of the--; line 51, "staring" should be --starting--. Column 10, line 11, after "to" insert --a--. Column 11, line 19, "7" should be --8--; line 47, "sad" should be --said--. Column 12, line 15, "for" should be --from--; line 18, "applied" should be --supplied--.

Signed and sealed this 21st day of March 1972.

(SEAL)
Attest:

EDWARD M. FLETCHER, JR.
Attesting Officer

ROBERT GOTTSCHALK
Commissioner of Patents